United States Patent
Kuss et al.

(10) Patent No.: US 12,387,351 B2
(45) Date of Patent: Aug. 12, 2025

(54) METHOD FOR PICKING UP AN OBJECT BY MEANS OF A ROBOTIC DEVICE

(71) Applicant: Robert Bosch GmbH, Stuttgart (DE)

(72) Inventors: Alexander Kuss, Schoenaich (DE); Anh Vien Ngo, Nehren (DE); Miroslav Gabriel, Munich (DE); Philipp Christian Schillinger, Renningen (DE); Zohar Feldman, Haifa (IL)

(73) Assignee: ROBERT BOSCH GMBH, Stuttgart (DE)

( * ) Notice: Subject to any disclaimer, the term of this patent is extended or adjusted under 35 U.S.C. 154(b) by 377 days.

(21) Appl. No.: 17/934,887

(22) Filed: Sep. 23, 2022

(65) Prior Publication Data

US 2023/0114306 A1 Apr. 13, 2023

(30) Foreign Application Priority Data

Sep. 29, 2021 (DE) ................. 10 2021 210 903.9

(51) Int. Cl.
*G06T 7/50* (2017.01)
*B25J 9/16* (2006.01)

(52) U.S. Cl.
CPC ............ *G06T 7/50* (2017.01); *B25J 9/1694* (2013.01); *G06T 2207/10024* (2013.01); *G06T 2207/10028* (2013.01); *G06T 2207/20084* (2013.01)

(58) Field of Classification Search
None
See application file for complete search history.

(56) References Cited

U.S. PATENT DOCUMENTS

| | | |
|---|---|---|
| 2013/0158947 A1 | 6/2013 | Suzuki |
| 2020/0147804 A1* | 5/2020 | Sugiyama ............... G06T 7/73 |
| 2022/0080590 A1* | 3/2022 | Jiang .................. B25J 9/1679 |

FOREIGN PATENT DOCUMENTS

| | | |
|---|---|---|
| DE | 19805794 A1 | 8/1998 |
| DE | 102006036346 A1 | 2/2008 |
| DE | 102008020579 A1 | 11/2009 |
| DE | 102014102943 A1 | 8/2015 |
| DE | 102018202389 A1 | 9/2018 |
| DE | 102019108787 A1 | 10/2019 |
| DE | 112019001507 T5 | 12/2020 |
| DE | 102020128653 A1 | 5/2021 |
| WO | 2020022302 A1 | 1/2020 |

* cited by examiner

*Primary Examiner* — Thomas D Lee
(74) *Attorney, Agent, or Firm* — NORTON ROSE FULBRIGHT US LLP

(57) ABSTRACT

A method for picking up an object by means of a robotic device. The method includes obtaining at least one depth image of the object; determining, for each of a plurality of points of the object, the value of a measure of the scattering of surface normal vectors in an area around the point of the object; supplying the determined values to a neural network configured to output, in response to an input containing measured scattering values, an indication of object locations for pick-up; determining a location of the object for pick-up from an output which the neural network outputs in response to the supply of the determined values; and controlling the robotic device to pick up the object at the determined location.

10 Claims, 3 Drawing Sheets

METHOD FOR PICKING UP AN OBJECT BY MEANS OF A ROBOTIC DEVICE

CROSS REFERENCE

The present application claims the benefit under 35 U.S.C. § 119 of German Patent Application No. DE 10 2021 210 903.9 filed on Sep. 29, 2021, which is expressly incorporated herein by reference in its entirety.

FIELD

The present invention relates to methods for picking up an object by means of a robotic device.

BACKGROUND INFORMATION

In order to enable flexible manufacture or processing of objects by a robot, it is desirable that the robot is capable of picking up (e.g., gripping) an object regardless of the position and orientation in which the object is placed into the working space of the robot, and is also capable of picking up variations of the object not yet seen.

When a robot removes objects from a container (bin picking), for example, there are several methods for recognizing the most promising locations for gripping for successful removal of an object from the container. These methods typically work with color (e.g., RGB) and depth images of the respective scenario, wherein either color or depth images are sufficient in some cases. In addition, most of these approaches rely on AI methods, e.g., using neural networks to learn a mapping between input data and promising gripping points.

One difficulty with these approaches is the generalization to different inputs, e.g., new scenes/backgrounds, new shapes of objects, different appearance/colors of objects, etc. In order to mitigate some of these generalization challenges, pre-processing steps can be used in order to highlight relevant aspects of the respective raw camera data.

Corresponding effective approaches for the pre-processing images of objects that enable the recognition of pick-up areas by a neural network are therefore desirable.

SUMMARY

According to various example embodiments of the present invention, a method for picking up an object by means of a robotic device is provided, the method comprising obtaining at least one depth image of the object; determining, for each of a plurality of points of the object, the value of a measure of the scattering of surface normal vectors in an area around the point of the object; supplying the determined values to a neural network configured to output, in response to an input containing measured scattering values, an indication of object locations for pick-up; determining a location of the object for picking up the object from an output which the neural network outputs in response to the supply of the determined values; and controlling the robotic device to pick up the object at the determined location.

By using a pre-processing of image data in the form of the determination of measured scattering values of (surface) normal vectors, the method described above enables a detection of locations for picking up objects that is more robust against image area changes and enables a better generalization to scenes and objects that are new (i.e., have not been seen during training) and that have a different appearance (than those seen during training) but have similar pick-up properties.

For example, the result of the pre-processing (i.e., the calculation of the measured scattering values) with which image input data of the neural network are supplemented results in more meaningful input data for the neural network. The training on the basis of such input data is therefore accelerated and the neural network may be selected to be relatively small since the mapping of input of the neural network to output of the neural network is less complicated or more direct.

The processing carried out, in particular the inference carried out by the neural network, is used to detect locations or areas or also poses for picking up objects. This is done without a model, i.e., solely by assessing the pick-up ability of locations of the object from the input images (e.g., RGB and depth input or only from the depth) instead of the comparison with a target object model. For example, determining the pick-up pose is relevant to applications in which a robot removes objects from a container, in order to plan the actions for pick-up accordingly. The recognition of the determination of locations or areas (or ultimately of the pose) for pick-up may also be relevant to other robot applications, e.g., to assembly, where a robot must grip objects. Applications are not limited to a particular type of pick-up device (e.g., gripper type).

Various exemplary embodiments of the present invention are specified below.

Exemplary embodiment 1 is a method for picking up an object by means of a robotic device as described above.

Exemplary embodiment 2 is a method according to exemplary embodiment 1, wherein the measure of the scattering is the standard deviation or the variance of the surface normal vectors in the area around the point of the object.

The standard deviation and the variance are proven measures of the scattering of variables.

Exemplary embodiment 3 is a method according to exemplary embodiment 1 or 2, wherein the output of the neural network indicates a pick-up quality for points of the object.

A (e.g., the best) pick-up location may then be selected from this output (by a corresponding control unit), wherein the size of the required area (e.g., for aspiration) may be considered. For example, an area of sufficient size in which the pick-up quality is the highest on average may be selected.

Exemplary embodiment 4 is a method according to one of exemplary embodiments 1 to 3, wherein the neural network is configured to output, in response to an input containing measured scattering values and depth image data, an indication of object locations for pick-up, and wherein the determined values are supplied together with the depth image to the neural network.

The consideration of the depth image itself by the neural network may increase the accuracy of the determination of pick-up locations.

Exemplary embodiment 5 is a method according to one of exemplary embodiments 1 to 4, wherein the neural network is configured to output, in response to an input containing measured scattering values and color image data, an indication of object locations for pick-up, and wherein the determined values are supplied together with one or more color images of the object to the neural network.

The consideration of one or more color images by the neural network may likewise increase the accuracy of the determination of pick-up locations.

Exemplary embodiment 6 is a method according to one of exemplary embodiments 1 to 5, wherein obtaining the depth image comprises pre-processing a camera depth image received from a camera to form the depth image, wherein the pre-processing comprises filling holes, reducing noise, and/or removing outliers.

This increases the reliability of the determination of pick-up locations.

Exemplary embodiment 7 is a method according to one of exemplary embodiments 1 to 6, wherein determining the values of the measure of the scattering of surface normal vectors comprises converting pixels of the depth image into 3D points and determining surface normal vectors from the 3D points.

The robustness and accuracy of the determination of the surface normal vectors and ultimately of the values of the scattering measure can thereby be increased. In particular, intrinsic and extrinsic parameters of a camera with which the depth image was taken may be considered.

Exemplary embodiment 8 is a method according to one of exemplary embodiments 1 to 7, wherein the robotic device comprises a suction device and is controlled to pick up the object at the determined location by means of the suction device.

The proposed approach of considering scattering measures of the surface normal vectors accounts particularly well for the physical requirements of suction pick-up devices, in which a sealed vacuum must be formed between the pick-up device and the object surface in order to lift the object, and the surface must therefore not be too rough (i.e., the scattering of the normal vectors should be low), for example.

Exemplary embodiment 9 is a control unit configured to perform a method according to one of exemplary embodiments 1 to 8.

Exemplary embodiment 10 is a computer program comprising instructions that, when executed by a processor, cause the processor to perform a method according to one of exemplary embodiments 1 to 8.

Exemplary embodiment 11 is a computer-readable medium storing instructions that, when executed by a processor, cause the processor to perform a method according to one of exemplary embodiments 1 to 8.

In the figures, similar reference symbols generally refer to the same parts throughout the various views. The figures are not necessarily to scale, emphasis being instead generally placed on the representation of the principles of the invention. In the following description, various aspects are described with reference to the following figures.

DETAILED DESCRIPTION OF EXAMPLE EMBODIMENTS

The following detailed description relates to the accompanying drawings, which show, for clarification, specific details and aspects of this disclosure in which the invention may be implemented. Other aspects may be used and structural, logical, and electrical changes may be made without departing from the scope of protection of the invention. The various aspects of this disclosure are not necessarily mutually exclusive since some aspects of this disclosure may be combined with one or more other aspects of this disclosure in order to form new aspects.

Various examples are described in more detail below.

Figure 1:
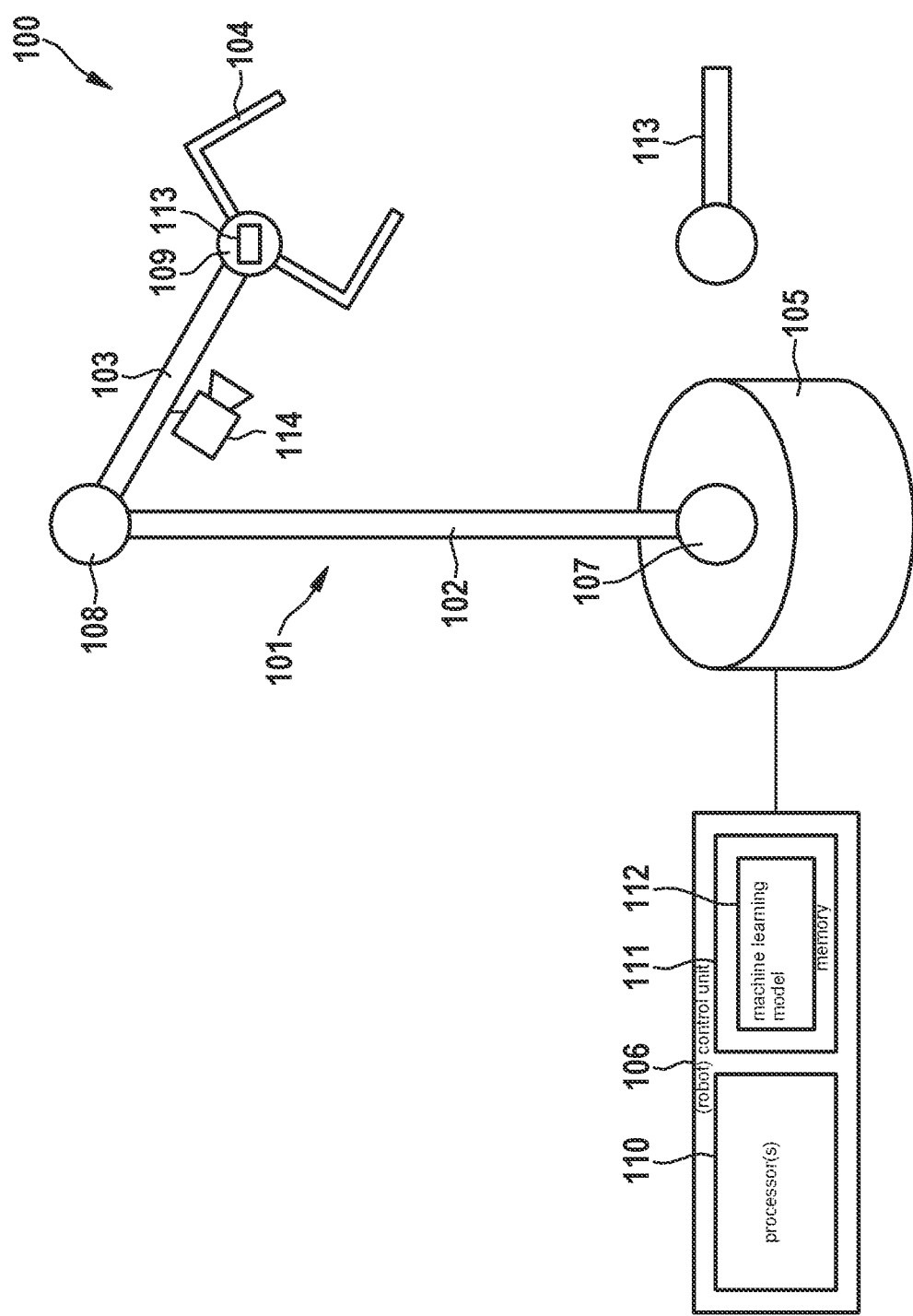
FIG. 1 shows a robot, according to an example embodiment of the present invention.

FIG. 1 shows a robot 100.

The robot 100 includes a robotic arm 101, for example an industrial robotic arm for handling or assembling a work piece (or one or more other objects). The robotic arm 101 includes manipulators 102, 103, 104 and a base (or support) 105 by means of which the manipulators 102, 103, 104 are supported. The term "manipulator" refers to the movable components of the robotic arm 101, the actuation of which allows physical interaction with the environment in order to, e.g., perform a task. For controlling, the robot 100 includes a (robot) control unit 106 designed to implement the interaction with the environment according to a control program. The final component 104 (which is furthest from the support 105) of the manipulators 102, 103, 104 is also referred to as the end effector 104 and may include one or more tools, such as a welding torch, gripping tool, painting device, or the like.

The other manipulators 102, 103 (which are closer to the support 105) may form a positioning device so that, together with the end effector 104, the robotic arm 101 is provided with the end effector 104 at its end. The robotic arm 101 is a mechanical arm that can provide functions similar to those of a human arm (possibly with a tool at its end).

The robotic arm 101 may include articulation elements 107, 108, 109 connecting the manipulators 102, 103, 104 to one another and to the support 105. An articulation element 107, 108, 109 may have one or more articulation joints that may each provide rotary movement (i.e., rotational movement) and/or translational movement (i.e., displacement) for associated manipulators relative to one another. The movement of the manipulators 102, 103, 104 may be initiated by means of actuators controlled by the control unit 106.

The term "actuator" may be understood to mean a component designed to produce a mechanism or process in response to being driven. The actuator may implement instructions (the so-called activation), created by the control unit 106, into mechanical movements. The actuator, e.g., an electromechanical converter, may be designed to convert, in response to being driven, electrical energy into mechanical energy.

The term "controller" may be understood to mean any type of logic-implementing entity that may include, for example, a circuit and/or a processor which is capable of executing software, firmware, or a combination thereof stored in a storage medium, and which can issue instructions, e.g., to an actuator in the present example. For example, the controller may be configured by program code (e.g., software) to control the operation of a system, of a robot in the present example.

In the present example, the control unit 106 includes one or more processors 110 and a memory 111 that stores code and data based on which the processor 110 controls the robotic arm 101. According to various embodiments, the control unit 106 controls the robotic arm 101 on the basis of a machine learning model 112 stored in the memory 111.

According to various embodiments, the machine learning model 112 is designed and trained to enable the robot 100 to recognize locations of an object 113 where the robot 100 may pick up (or otherwise interact with, e.g., paint) the object 113.

For example, the robot 100 may be equipped with one or more cameras 114 that enable it to capture images of its work space. For example, the camera 114 is attached to the robotic arm 101 so that by moving around the robotic arm 101, the robot can take images of the object 113 from various perspectives.

According to various embodiments, the machine learning model 112 is a neural network 112 and the control unit 106 supplies the neural network 112 with input data based on the one or more digital images (color images, depth images, or both) of an object 113 and the neural network 112 is configured to indicate locations (or areas) of the object 113 suitable for picking up the object 113. For example, the neural network may appropriately segment an input image showing the object 113, e.g., associate each pixel with a value ("pick-up quality value") indicating how well the pixel is suitable for pick-up. The control unit 106 can then select an area of sufficient size as a location for pick-up where these values are sufficiently high (e.g., above a threshold value, at a maximum on average, etc.).

According to various embodiments, the raw image data provided by the cameras are pre-processed by the control unit 106 instead of supplying them directly to the neural network 112 as input. The result of this pre-processing is used (possibly together with at least a portion of the raw image data) as an input of the neural network 112 so that a quality improvement with respect to the input data of the neural network 112 is achieved. Quality improvement here means that the raw image data are changed in one or more of the following ways:

(1) Noise and artifacts are removed, which may be more prevalent in data from particular sources, e.g., as a result of depth completion to remove missing data characteristic of a particular camera type, or as a result of artificially generating such artifacts in synthetic data. This form of pre-processing, also referred to as image enhancement pre-processing, is also a useful preparation for the calculations described below.

(2) The pre-processed data effect training of the neural network 112 for various modalities beyond color and depth. One modality specifically taken into consideration according to various embodiments is the standard deviation (or another measure of scattering, such as the variance) of normal vectors of the surface of objects shown in the images. The normal vector standard deviation is suitable to represent the local flatness of a surface and is thus information particularly relevant to the gripping quality (or to the quality of an object area for aspiration). Further modalities can result from other pre-processing steps, e.g., from object masks or background segmentation.

Figure 2:
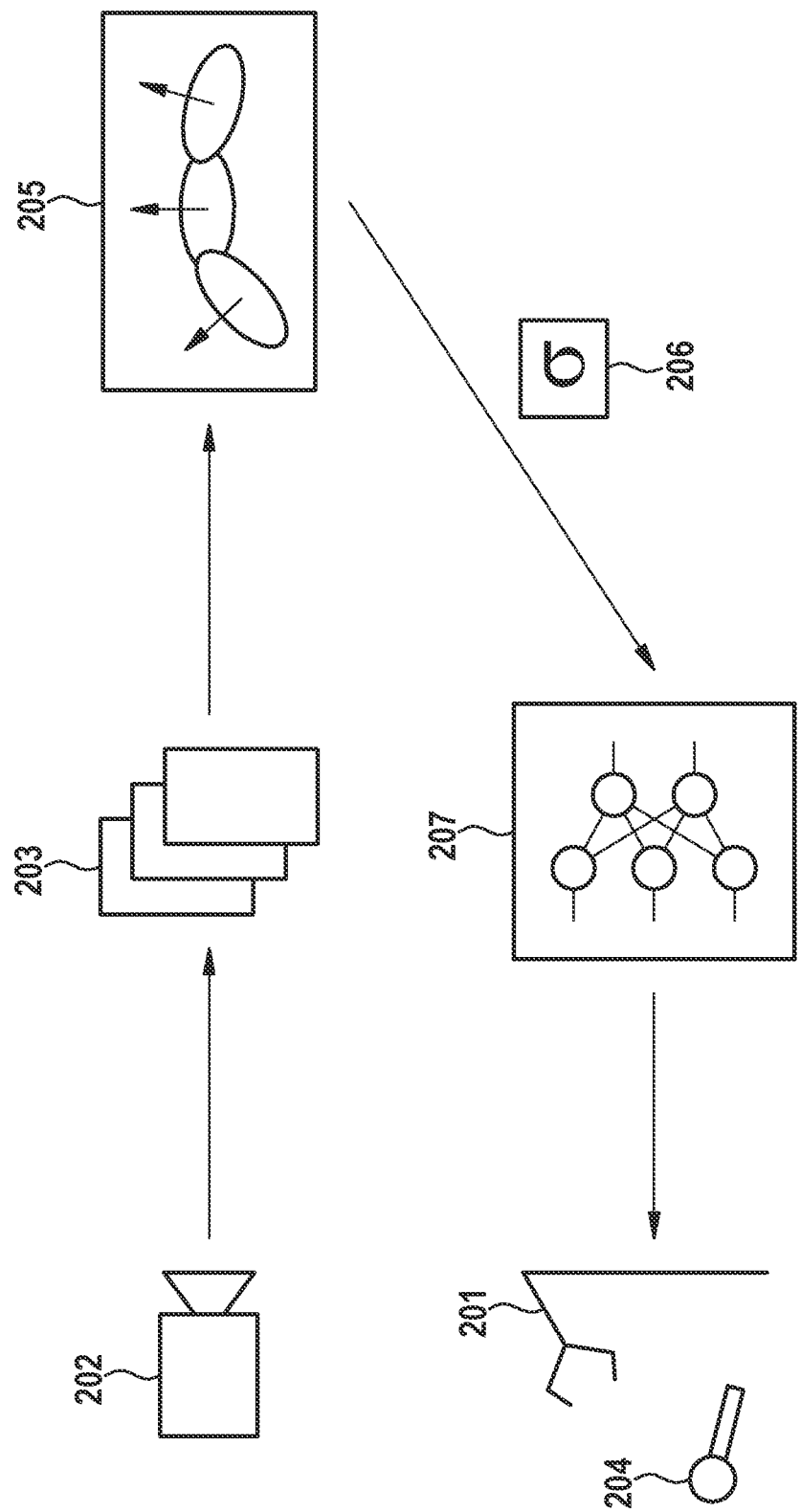
FIG. 2 illustrates data processing for picking up an object by means of a robot, according to an example embodiment of the present invention.

FIG. 2 illustrates data processing for picking up an object by means of a robot 201 (corresponding to the robot 100).

One or more cameras 202, for example corresponding to the camera 114, provide raw image data (i.e., one or more images) 203. It is assumed that the raw image data in particular include depth information about an object 204 to be picked up by the robot 201.

From this depth information, normal vectors of the surface of the object 204 and their standard deviations (in various areas of the surface) 206 are determined in a pre-processing 205. This is supplied as input to a neural network 207. The input of the neural network 207 may also include portions (or all) of the raw image data 203 or image data generated therefrom according to previous image enhancement pre-processing (e.g., noise reduction). As mentioned above, such previous image enhancement pre-processing may also be used to generate image data, which are then used as the basis of the standard deviation determination 205.

The neural network 201 is trained (e.g., by means of corresponding training inputs and associated target outputs, i.e., ground truth labels for monitored learning) to map the input to an output identifying locations or areas of the object 113 that are (e.g., particularly well) suited for picking up the object.

Various architectures can be used for the neural network 207. The neural network 207 may comprise only a single input channel for the standard deviations of the normal vectors or a multi-channel input containing the standard deviation of the normal vectors as data of one channel in addition to others (e.g., color image data and/or depth image data). Examples are fully convolutional networks (e.g., UNet, ResNet) that assign a value (indicative of the suitability of the respective location for picking up the object shown) to each pixel of an input image in order to form an output image of the same size as the input image. This enables further processing of the output for determining a pick-up pose, e.g., by selecting a global maximum in the output image.

Established image processing (e.g., computer vision) algorithms may be used for the pre-processing 205 of image data (in particular depth image data) in order to determine the standard deviation of the normal vectors. In order to calculate the normal vectors, the gradient of a respective depth image can be calculated numerically. Average values of the normal vectors may be calculated pixel-wise by means of image convolution. The calculation of the standard deviation from the normal vectors and their average values takes place according to the statistical operation defined and established for this purpose.

The data processing consisting of (normal vector standard deviation determination) pre-processing 205 and neural network 207 provides an output that can be interpreted as an indication of a pick-up area or a pick-up pose. As explained above, it receives depth information of the object 204, i.e., a digital depth image, for example. The neural network 207 may also additionally receive one or more color images of the object.

According to one embodiment, after such images 203 are received, the following is performed:

(A) [optional] image enhancement pre-processing of the received depth image,
(B) calculation of the standard deviation of normal vectors in the depth image,
(C) inference by the neural network 207 in order to detect promising candidates for pick-up locations and/or pick-up poses, and
(D) [optional] selection of a pick-up location and/or pick-up pose from the detected candidates.

Possibilities for optional image enhancement pre-processing that are particularly useful for calculating the normal vector standard deviations are the following:

(A1) filling of holes in the depth image, i.e., of pixels with missing values, e.g., by (A1a) using inpainting operations, (A1b) using values of nearest neighbors, (A1c) using dilatation operations, etc. The filling of holes improves the quality of the normal vectors since normal vectors near holes are less accurate due to the lack of information and hole patterns can dominate network inference and lead to overfitting.

(A2) Smoothing of the values in the depth image, e.g., in order to reduce noise. This may, for example, take place by (A2a) classical computer vision blurring operations, or (A2b) outlier removal by local filtering operations. Smoothing improves the meaningfulness of the standard deviation of the normal vectors since a high standard deviation more likely reflects the actual standard deviation of the surface normal vectors than a standard deviation, which is only to be ascribed to noise in the depth measurements.

(A3) Filtering of depth values according to various criteria, e.g., (A3a) removing depth values outside of a target range or (A3b) subtracting a background depth image. Filtering is useful for concentrating network inference on relevant areas of the image. It should be noted that filtering by setting the depth to a particular value, e.g., zero, generates a low standard deviation of the normal vectors, which could be misleading. According to one embodiment, the standard deviation for unsuitable pixels is therefore explicitly set to a high value.

From the (optionally pre-processed) depth image, the normal vector standard deviation for each pixel of the depth image may be calculated as follows:

(B1) [optional] all pixels of the depth image are converted (using their depth pixel value) to points in 3D space, in consideration of the intrinsic parameters of the camera 202, if known. The following operations then take place with these points, instead of directly with the depth image, by constructing an image containing the 3D coordinates of the point for each pixel. This may improve the robustness and accuracy of the normal vectors determined.

(B2) Calculation of the normal vectors from the depth image or the points of the image generated in (B1), by forming a numeric gradient, e.g., by shifting the depth image and subtracting the shifted depth image from the original depth image. In this way, depth changes in the x and y directions can be determined, for example, and a normal vector can be obtained therefrom by using the vector product and subsequent normalization. The normal vectors at all pixel positions may be represented in the form of a further image having the same dimensions as the depth image and comprising three channels indicating the x, y and z components of the normal vector (due to the normalization, two of these channels are also sufficient, without loss of information).

(B3) Calculation of an average of the normal vectors for each pixel in a particular vicinity of the pixel, i.e., a particular catchment area. The catchment area may be defined as desired, but its size is selected, for example, according to the size of the pick-up device, i.e., equal to the size of the "footprint" of the pick-up device, i.e., the area used for picking up by the pick-up device. In the general case, the catchment area is given by a matrix of a particular size (typically much smaller than the depth image or the image constructed in (B1)), the matrix defining a convolution kernel. The matrix contains entries for pixel positions in a vicinity of the pixel (and for the pixel itself) for which the average is to be calculated, and a zero indicates that the value at the respective pixel position should not be considered, and an entry greater than zero indicates that it should be considered with a corresponding weighting. The averages of the normal vectors may then be calculated by means of a convolution operation with the convolution kernel, wherein division by the sum of the entries of the convolution kernel subsequently takes place. Averaging takes place component-wise.

The result is another image that has the same dimensions (and the same number of channels) and contains, for each pixel, a value $E(X)$ that contains the average of relevant normal vectors X in its vicinity.

(B4) The average value calculation of (B3) is repeated for the component-wise squared normal vectors $X^2$ instead of X, i.e., for each pixel, an average of (component-wise) squared normal vectors in the vicinity of the pixel (and of the pixel itself). The result is referred to as $E(X^2)$.

(B5) The normal vector standard deviation STD(X) is calculated component-wise and pixel-wise as $$STD(X) = \sqrt{E(X^2) - E(X)^2}$$

The root operation does not change the order and may therefore be omitted to reduce computing time.

According to one embodiment, the standard deviation thus calculated component-wise is used as an input for the neural network 207. The standard deviations may also be summed across all components for each pixel, and the result (i.e., an image with one channel containing the summed standard deviation) may be used as input for the neural network 207, possibly along with one or more color and/or depth images 203.

Furthermore, the values of the standard deviation of each pixel may be normalized across the image, e.g., to the value range 0-1, before they are used as an input for the neural network 207, in order to provide better comparability of various images, which supports the generalization capability of the neural network.

According to one embodiment, additional methods may be used to ensure comparability of values of the standard deviation. For example, a normalization method such as "contrast limited adaptive histogram equalization" (CLAHE) is suitable for emphasizing relative differences in the standard deviation more instead of using absolute values. This is in particular useful in images where large differences in the standard deviation occur locally.

The neural network 207 can be trained using existing data sets comprising depth images and possibly color images, since all the information required for this purpose can be determined from these data.

The neural network 207 can either directly output a pick-up pose/location or optionally a list of pick-up poses/locations, a pixel-wise pick-up quality, or an output in another format, which can subsequently be used in a further processing to derive a pick-up location and a pick-up pose of the object 204 (wherein the derivation of the pick-up pose includes the derivation of the pick-up location).

(D1) If a pixel-wise pick-up quality is determined by the neural network 207, the control unit 106 determines from this output a set of candidates for pick-up locations, for example. This may be done (D1a), for example, by selecting local maxima of the pick-up quality, (D1b) by thresholding the pick-up quality and clustering the result into areas, (D1c) by combining the pick-up quality with further processing results, e.g., with object segmentation.

(D2) If candidates for pick-up locations were determined as in (D1) or the pick-up locations are specified in pixel coordinates, the control unit 106 calculates a complete pick-up pose by converting each pixel of the pick-up location into a 3D position, cf. (B1), and selects an orientation by changing the sign of the normal vector at this pixel, cf. (B2).

(D3) If more than one pick-up pose was determined, the control unit 106 selects one thereof or arranges (sorts) the results. The classification can, for example, take place as follows: (D3a) on the basis of a particular value of the pick-up quality, (D3b) based on a cluster size, (D3c) on the basis of an instance evaluation, (D3d) on the basis of the height of the pose, etc.

Figure 3:
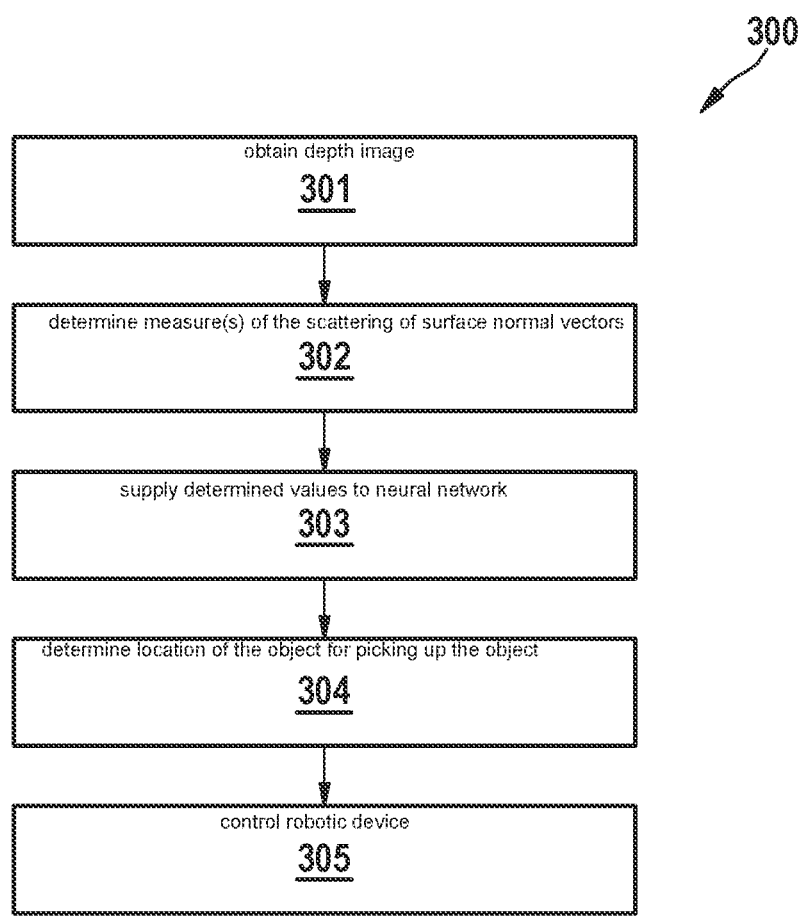
FIG. 3 shows a flowchart illustrating a method for picking up an object by means of a robotic device, according to an example embodiment of the present invention.

In summary, according to various embodiments, a method as shown in FIG. 3 is provided.

FIG. 3 shows a flowchart 300 illustrating a method for picking up an object by means of a robotic device.

At 301, at least one depth image of the object is obtained.

At 302, for each of a plurality of points of the object, the value of a measure of the scattering of surface normal vectors in an area around the point of the object is determined.

At 303, the determined values are supplied to a neural network configured (e.g., trained) to output, in response to an input containing measured scattering values, an indication of object locations for pick-up.

At 304, a location of the object for picking up the object is determined from an output which the neural network outputs in response to the supply of the determined values (e.g., selected from locations or areas which the output of the neural network specifies as being suitable).

At 305, the robotic device is controlled to pick up the object at the determined location.

The method may comprise training the neural network to output, in response to an input containing measured scattering values, an indication of object locations for pick-up. This takes place, for example, by means of supervised learning by using objects with known locations for pick-up (or pick-up poses, depending on the output of the neural network).

The method of FIG. 3 may be performed by one or more computers having one or more data processing units. The term "data processing unit" may be understood to mean any type of entity that enables the processing of data or signals. For example, the data or signals may be processed according to at least one (i.e., one or more than one) specific function performed by the data processing unit. A data processing unit may comprise or be formed from an analog circuit, a digital circuit, a logic circuit, a microprocessor, a microcontroller, a central processing unit (CPU), a graphics processing unit (GPU), a digital signal processor (DSP), an integrated circuit of a programmable gate assembly (FPGA), or any combination thereof. Any other way of implementing the respective functions described in more detail herein may also be understood as a data processing unit or logic circuitry. One or more of the method steps described in detail herein may be performed (e.g., implemented) by a data processing unit by one or more particular functions executed by the data processing unit.

The approach of FIG. 3 may serve to generate a control signal for a robotic device. The term "robotic device" may be understood to mean any physical system (with a mechanical part whose movement is controlled), such as a computer-controlled machine, a household appliance, an electric tool, or a manufacturing machine.

Color and depth images, for example, serve as input data for the neural network. However, these images may also be supplemented by sensor signals from other sensors, e.g., radar, LiDAR, ultrasound, movement, thermal images, etc.

The neural network classifies the input data and, for example, detects the presence of objects and, on the basis of the sensor data, performs semantic segmentation in terms of locations or areas where the objects can be picked up, poses (e.g., a gripper orientation) with which the objects can be picked up (e.g., gripped).

Embodiments can be used to train a machine learning system and to control a robot, e.g., robot manipulators autonomously in order to accomplish various manipulation tasks under various scenarios. In particular, embodiments are applicable to the control and monitoring of the performance of manipulation tasks, e.g., in assembly lines.

Although specific embodiments have been illustrated and described herein, the person skilled in the art recognizes that the specific embodiments shown and described may be substituted for a variety of alternative and/or equivalent implementations without departing from the scope of the present invention. This application is intended to cover any adaptations or variations of the specific embodiments discussed herein.

What is claimed is:

1. A method for picking up an object using a robotic device, comprising the following steps:
    obtaining at least one depth image of the object;
    determining, for each one of a plurality of points of the object, a value of a measure of a scattering of surface normal vectors in an area around the point of the object;
    supplying the determined values to a neural network configured to output, in response to an input containing measured scattering values, an indication of object locations for pick-up;
    determining a location of the object for picking up the object from an output which the neural network outputs in response to the supply of the determined values; and
    controlling the robotic device to pick up the object at the determined location.

2. The method as recited in claim 1, wherein the measure of the scattering is a standard deviation or a variance of the surface normal vectors in an area around the point of the object.

3. The method as recited in claim 1, wherein the output of the neural network indicates a pick-up quality for the points of the object.

4. The method as recited in claim 1, wherein the neural network is configured to output, in response to an input containing measured scattering values and depth image data, an indication of object locations for pick-up, and wherein the determined values are supplied together with the depth image to the neural network.

5. The method as recited in claim 1, wherein the neural network is configured to output, in response to an input containing measured scattering values and color image data, an indication of object locations for pick-up, and wherein the determined values are supplied together with one or more color images of the object to the neural network.

6. The method as recited in claim 1, wherein the obtaining of the depth image includes pre-processing a camera depth image received from a camera to form the depth image, wherein the pre-processing includes filling holes and/or reducing noise and/or removing outliers.

7. The method as recited in claim 1, wherein the determining of the values of the measure of the scattering of surface normal vectors includes converting pixels of the depth image into 3D points and determining surface normal vectors from the 3D points.

8. The method as recited in claim 1, wherein the robotic device includes a suction device and is controlled to pick up the object at the determined location using the suction device.

9. A control unit configured to control a robotic device to pick up an object, the control unit configured to:
    obtain at least one depth image of the object;
    determine, for each one of a plurality of points of the object, a value of a measure of a scattering of surface normal vectors in an area around the point of the object;
    supply the determined values to a neural network configured to output, in response to an input containing measured scattering values, an indication of object locations for pick-up;

determine a location of the object for picking up the object from an output which the neural network outputs in response to the supply of the determined values; and control the robotic device to pick up the object at the determined location.

10. A non-transitory computer-readable medium on which are stored instructions for picking up an object using a robotic device, the instructions, when executed by a processor, causing the processor to perform the following steps:

obtaining at least one depth image of the object;

determining, for each one of a plurality of points of the object, a value of a measure of a scattering of surface normal vectors in an area around the point of the object;

supplying the determined values to a neural network configured to output, in response to an input containing measured scattering values, an indication of object locations for pick-up;

determining a location of the object for picking up the object from an output which the neural network outputs in response to the supply of the determined values; and controlling the robotic device to pick up the object at the determined location.

\* \* \* \* \*